Dec. 31, 1946. C. M. SAVRDA 2,413,383
APPARATUS FOR POSITIONING FISH
Filed June 17, 1944 7 Sheets-Sheet 4

INVENTOR.
CHARLES M. SAVRDA
BY
Wm. S. Pritchard
ATTORNEY.

Dec. 31, 1946.  C. M. SAVRDA  2,413,383
APPARATUS FOR POSITIONING FISH
Filed June 17, 1944  7 Sheets-Sheet 5
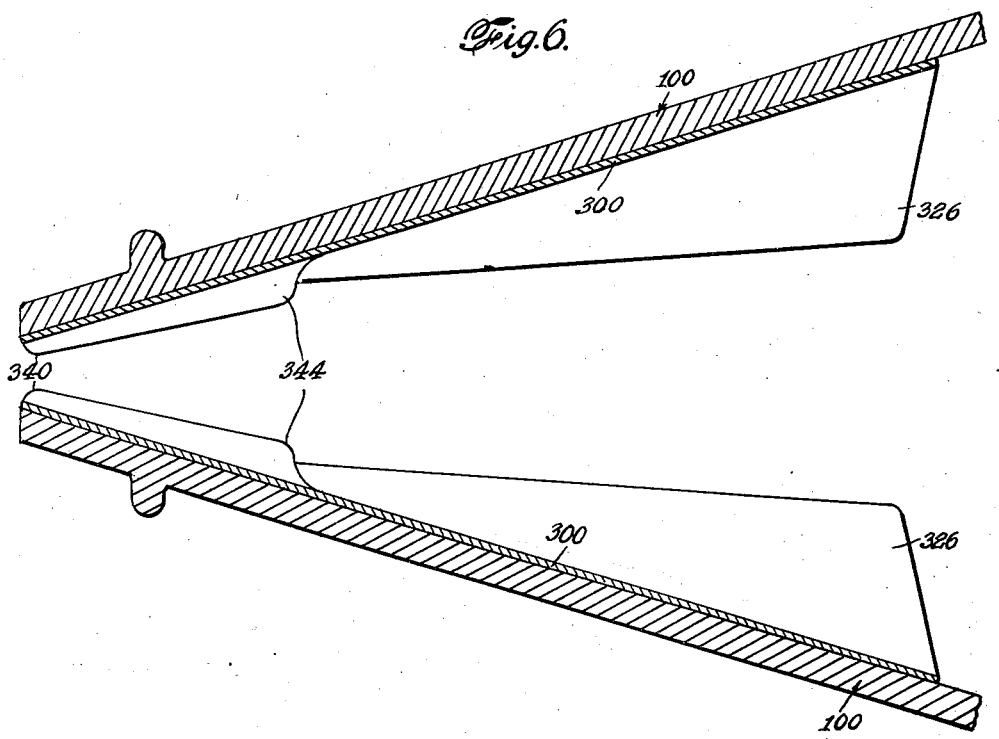
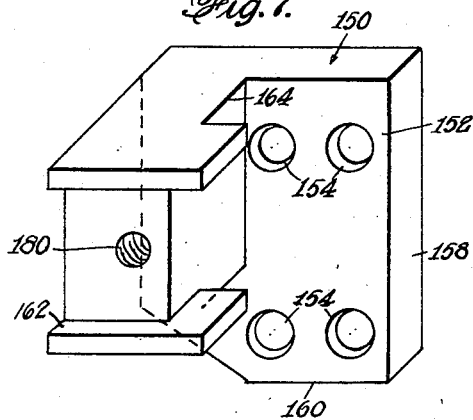
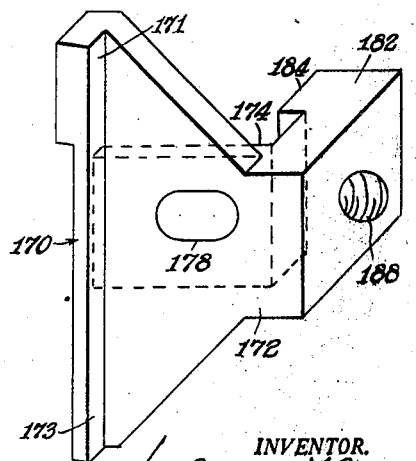
INVENTOR.
CHARLES M. SAVRDA
BY
ATTORNEY.

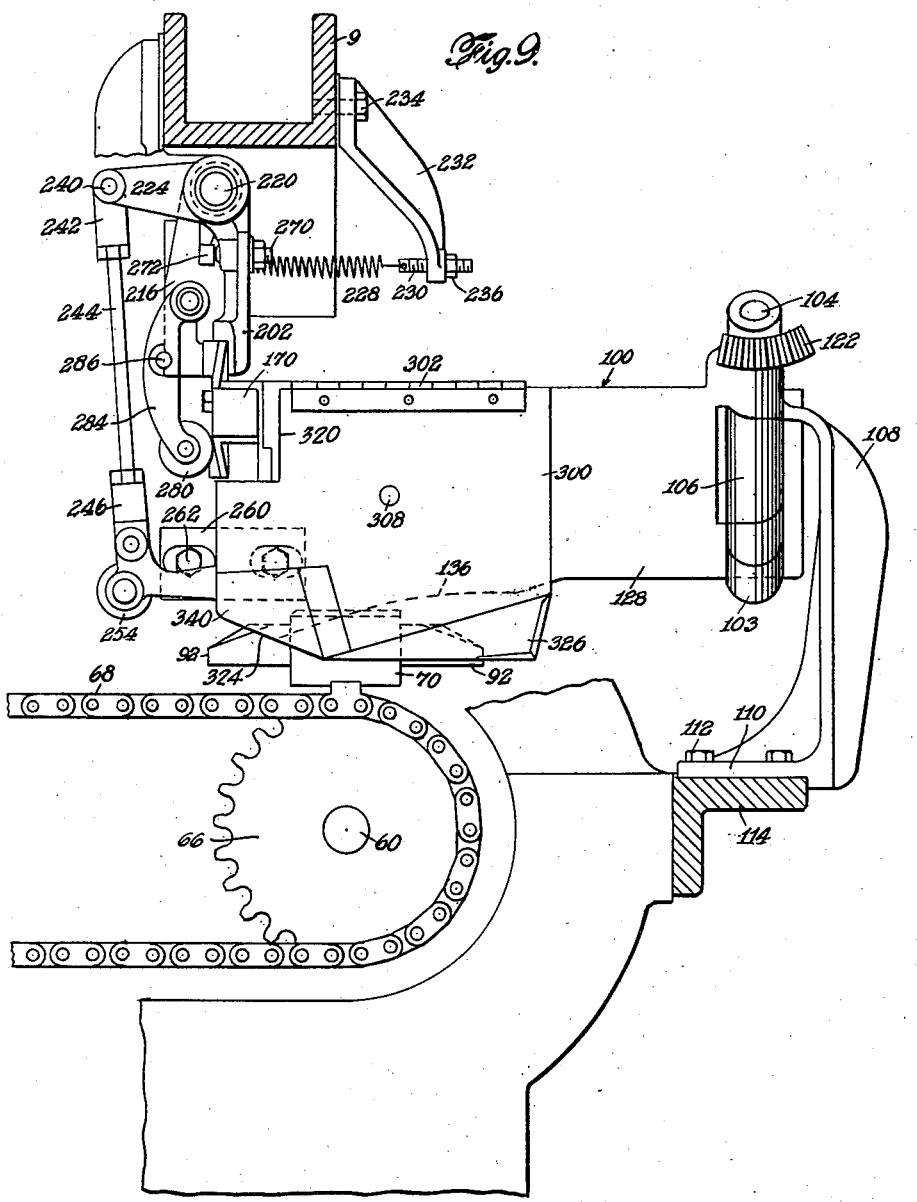

Dec. 31, 1946.                C. M. SAVRDA                    2,413,383
                         APPARATUS FOR POSITIONING FISH
                         Filed June 17, 1944        7 Sheets-Sheet 7
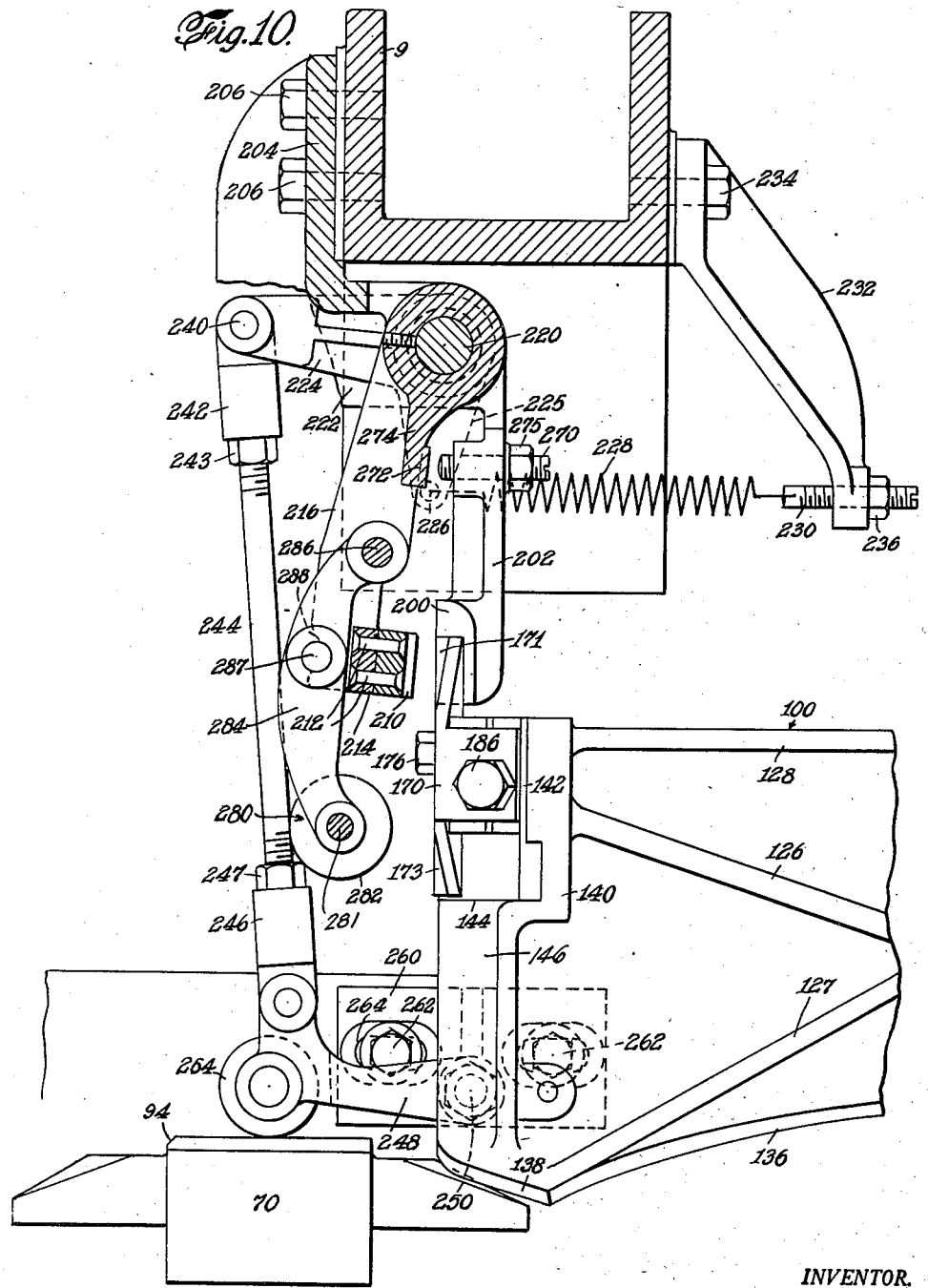
INVENTOR.
CHARLES M. SAVRDA
BY
ATTORNEY.

Patented Dec. 31, 1946

2,413,383

UNITED STATES PATENT OFFICE 2,413,383

APPARATUS FOR POSITIONING FISH

Charles M. Savrda, Bay Shore, N. Y., assignor to The Atlantic Coast Fisheries Company, New York, N. Y., a corporation of Maine Application June 17, 1944, Serial No. 540,776

20 Claims. (Cl. 198—34)

This invention relates to improvements in fish filleting machines, and more particularly to an apparatus for properly positioning a fish, tail leading and back downward, so that it can be gripped at the tail and fed through the machine where the various operations incidental to the filleting operations are performed.

United States Patent 2,149,021 discloses a fish filleting machine wherein a pair of tail-gripping devices engage the tail of a fish on opposite sides and clamp it therebetween, the fish having been previously fed, tail leading and back downward, to the position where it is clamped between the tail-gripping devices. The gripping devices are mounted in predetermined spaced relationship on a carrier, such as a pair of chains, so as to move during their gripping action in a horizontal plane away from the feeding point. Their movement carries the fish along, with their backs down, through various successive stations, whereby parallel incisions (beginning at the tail end) are made in the back of each fish and extend up to almost the backbone. These incisions extend all the way to the head end of the fish (which has preferably been decapitated). Each fish is then guided to a pair of belly-slicing rotary disc knives which are positioned to rotate on an axis above the plane of movement of the gripping devices. These knives are rotatably and yieldably supported so that, when the tail of the fish first engages them, they are pushed upwardly. Just before the fish reach these knives, the belly fins are engaged by a straightening device which straightens them into a plane so that they may pass between the belly-slicing knives. Rotatably mounted below these knives are a pair of discs which engage in the back incisions and aid in continuing the movement of the fish, the gripping devices having now disengaged them. About the time the gripping devices disengage the tail of the fish, means are provided to give the fish a movement toward the belly-slicing knives to insure the feeding of the fish sufficiently thereon so that they, together with the traction discs (both of which are rotating at high speed), will cause the fish to pass between them. The belly-slicing knives make a pair of parallel incisions closely contiguous to and on opposite sides of the belly spikes almost up to the backbone. These knives continue their cutting until they reach the belly cavity and travel on through it as the fish move through the zone of action of the knives. At this stage of the operation, the fillets are attached by a small ribbon of flesh to the backbone of the fish and also to the ribs of the fish. As the fish leave the zone of action of the belly-slitting knives, they are projected on to a pair of ribbing knives sufficiently spaced so that the backbone may move between them. The fish are next engaged by feeding devices which engage in the belly cavity and convey the fish over the ribbing knives which are so shaped as to scrape the flesh from the sides of the ribs.

United States Patent 2,137,291, and copending application Serial No. 525,546, disclose dorsal fin-removing devices which may be used in conjunction with the apparatus of Patent 2,149,021. When such dorsal fin-removing devices are utilized, it will be understood that they are positioned prior to the mechanisms which make the incisions in the back of the fish.

In fish filleting machines of the type previously mentioned, it is highly desirable to properly position each fish before the tail thereof is clamped between the tail-gripping elements. United States application Serial No. 536,506 discloses a gate for preliminarily positioning each fish and a feeding conveyer for feeding each fish at a predetermined time from said gate. This gate is disposed before and in advance of the station in the machine where the fish is gripped by the tail-gripping devices. United States Patent 2,149,021 discloses a gate for finally positioning each fish at the station in the machine where the tail of the fish is clamped between the gripping elements.

For convenience, the gate for preliminarily positioning the fish and the gate at the station in the machine where the tail of the fish is gripped are designated herein as the first and second gates respectively.

An object of this invention is to provide a new and improved gate for properly and finally positioning a fish, tail leading and back downward, at the station in the machine where the tail of the fish is clamped between the tail-gripping devices.

Another object of this invention is to provide a second gate provided with means to permit a predetermined portion of the fish at the tail end to be exposed so that it can be properly clamped between the tail-gripping mechanism.

An additional object of this invention is to provide a second gate provided with locking means to retain the fish fed thereto in proper position, and which locking means are rendered ineffective at the time the tail is clamped between the tail-gripping elements.

A further object of this invention is to provide a locking means for the second gate which includes a primary latching means and a secondary latching means.

A still further object of the invention is to provide a second gate which can be adjusted in accordance with the variety of the fish or the condition of the fish depending upon the season of the year.

A still further object of this invention is to provide a second gate with means to prevent jamming when the gates are in open position or cannot close because of the presence of foreign matter.

Other and additional objects will become apparent from the following description, appended claims and accompanying drawings forming a part of this specification and wherein:

Figure 6 is a section on line 6—6 of Figure 5;

Figure 7 is a perspective view of one of the male latch blocks;

Figure 8 is a perspective view of a male latch element complemental to the latch shown in Figure 7;

Figure 9 is a section on line 9—9 of Figure 4; and

Figure 10 is an enlarged sectional view of the gate-operating mechanism with the gate in open position.

Figure 1:
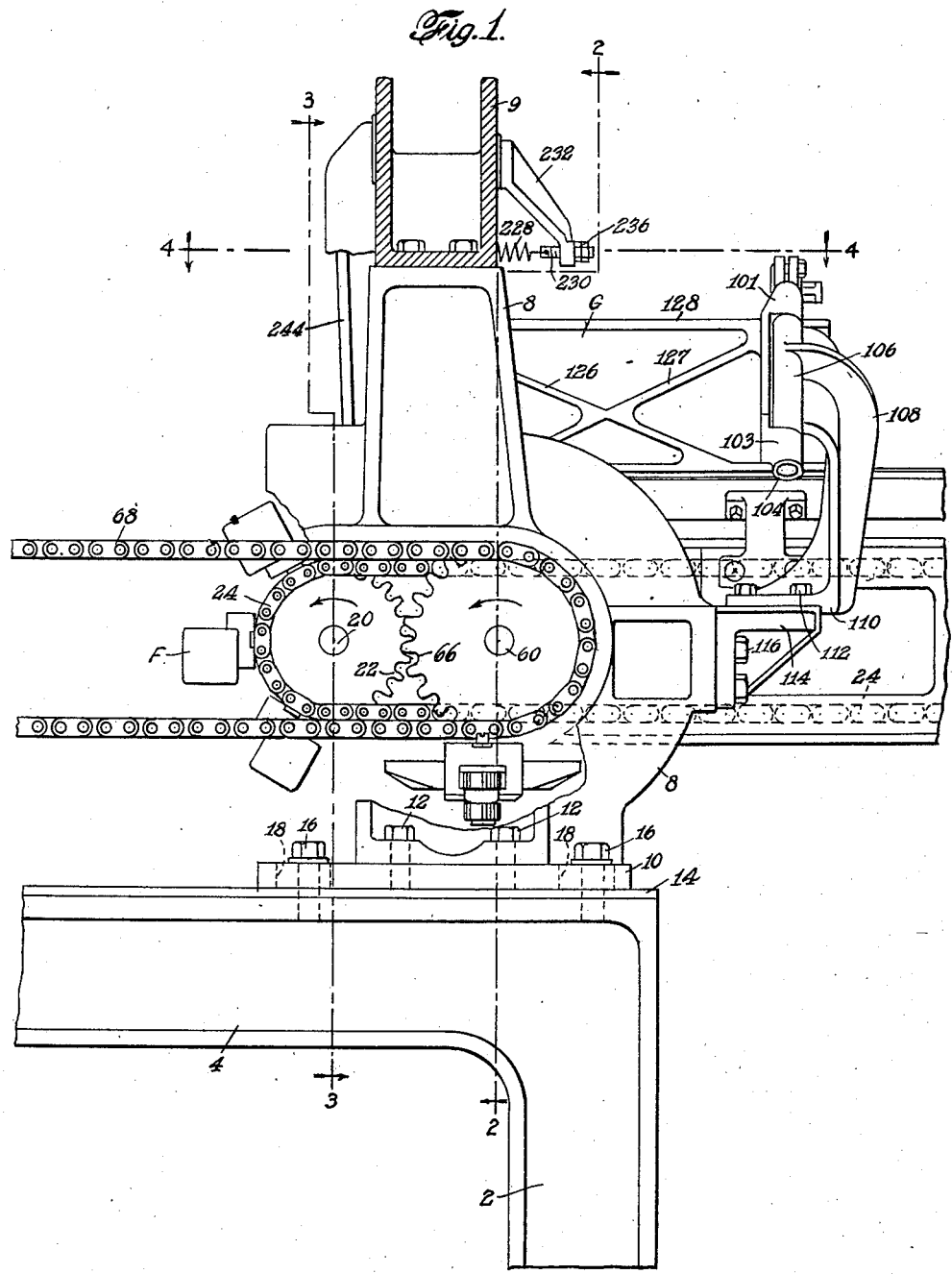
Figure 1 is a side elevation, partly in section, showing the location of the second gate in the machine.

Referring now to the drawings wherein like reference numerals designate like parts, the reference numerals 2 and 4 designate the vertical and longitudinal members of the frame of the machine and which are secured together by cross-members 6. A pair of spaced columns 8, one at each side of the machine, are secured together by a channel tie 9 to form an upper frame which carries the apparatus, as hereinafter described, and is slidably mounted on the lower frame. As shown in Figure 1, each column 8 is secured at its base to a plate 10 by means of screws 12. The plate 10 is disposed on a friction plate 14 which is secured by screws 16 to the frame of the machine. The screws 16 pass through slots 18 in the plate 10. Upon loosening of the screws 16, the plate 10 may be moved relative to the frame whereby the columns 8 may be moved longitudinally of the machine, so that the apparatus carried by the columns may be adjusted as desired.

The fish is fed to the gate, generally designated by the reference character G, by a feed conveyer, generally designated by the reference character F, and which will now be described. At the discharge end of the feed conveyer there is provided a shaft 20 which is mounted adjacent each end thereof in ball barings carried by the respective columns 8. A pair of spaced sprockets 22 is secured in any appropriate manner to the shaft 20, and a pair of chains 24 extends rearwardly from the respective sprockets 22 in a substantially horizontal direction to a like pair of and appropriately mounted sprockets (not shown). One end of the shaft 20 is provided with a gear (not shown) which meshes with a gear 26, and which is driven from any suitable source of power (not shown).

Figure 3:
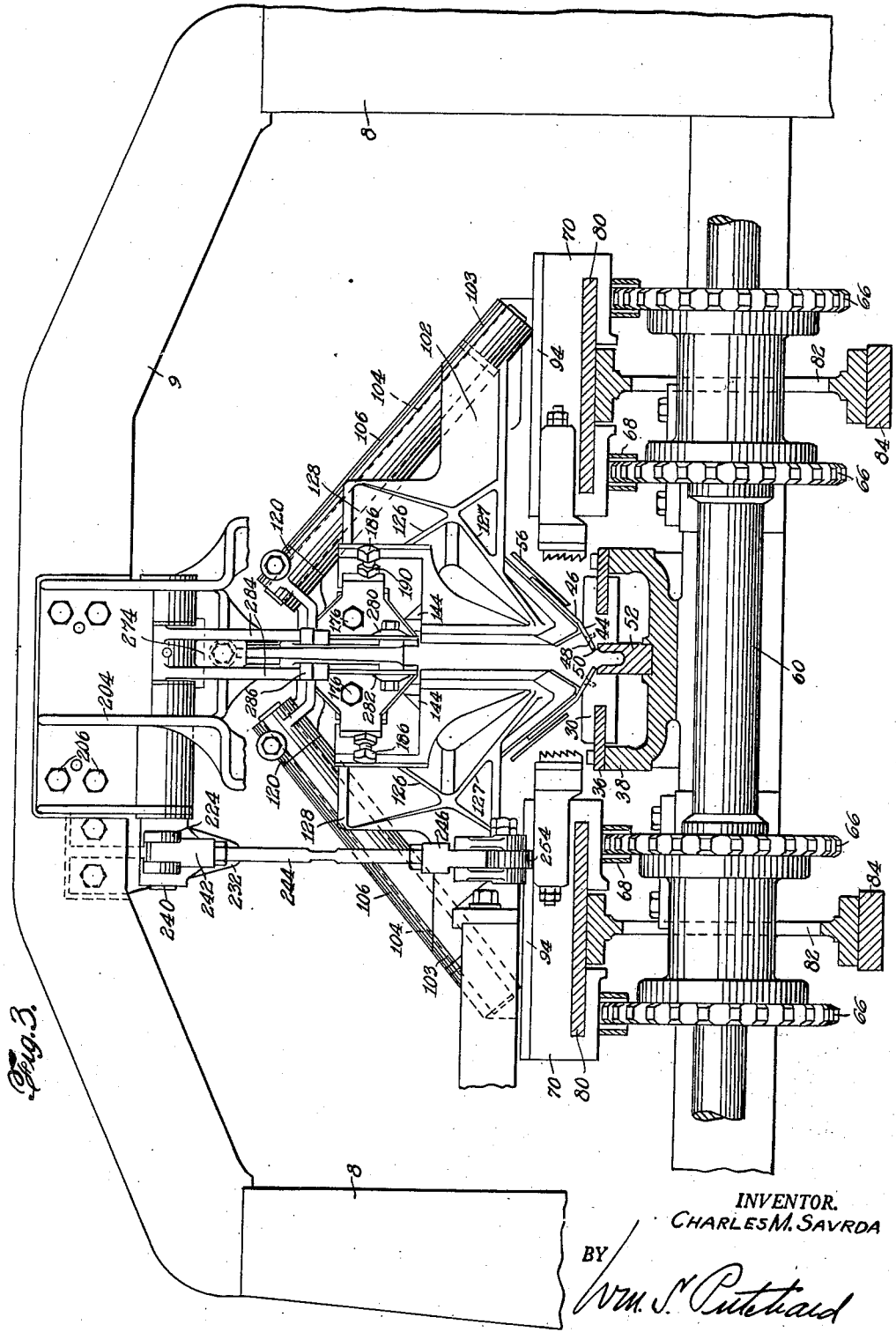
Figure 3 is a section on line 3—3 of Figure 1.

Mounted on each pair of chains 24 and transversely aligned are pairs of blocks 30. Each block is secured by a pair of ears 32 to opposite sides of a link of the respective chains 24. Each block is provided with a channel 34 into which a rail 36 is positioned and over which the blocks travel during the upper flight of the chains 24. As shown in Figure 3, there are two rails 36 and each rail 36 extends longitudinally of the machine adjacent the top flight of the chains 24 and is carried on a support 38 appropriately mounted in the machine. During the lower flight of the chains 24, the blocks 30 pass over rails 40. As shown in Figuer 2, there are also two rails 40 and each of the rails 40 extends longitudinally of the machine adjacent the lower flight of the chains 24 and is carried on a support 42 appropriately mounted in the machine.

Figure 2:
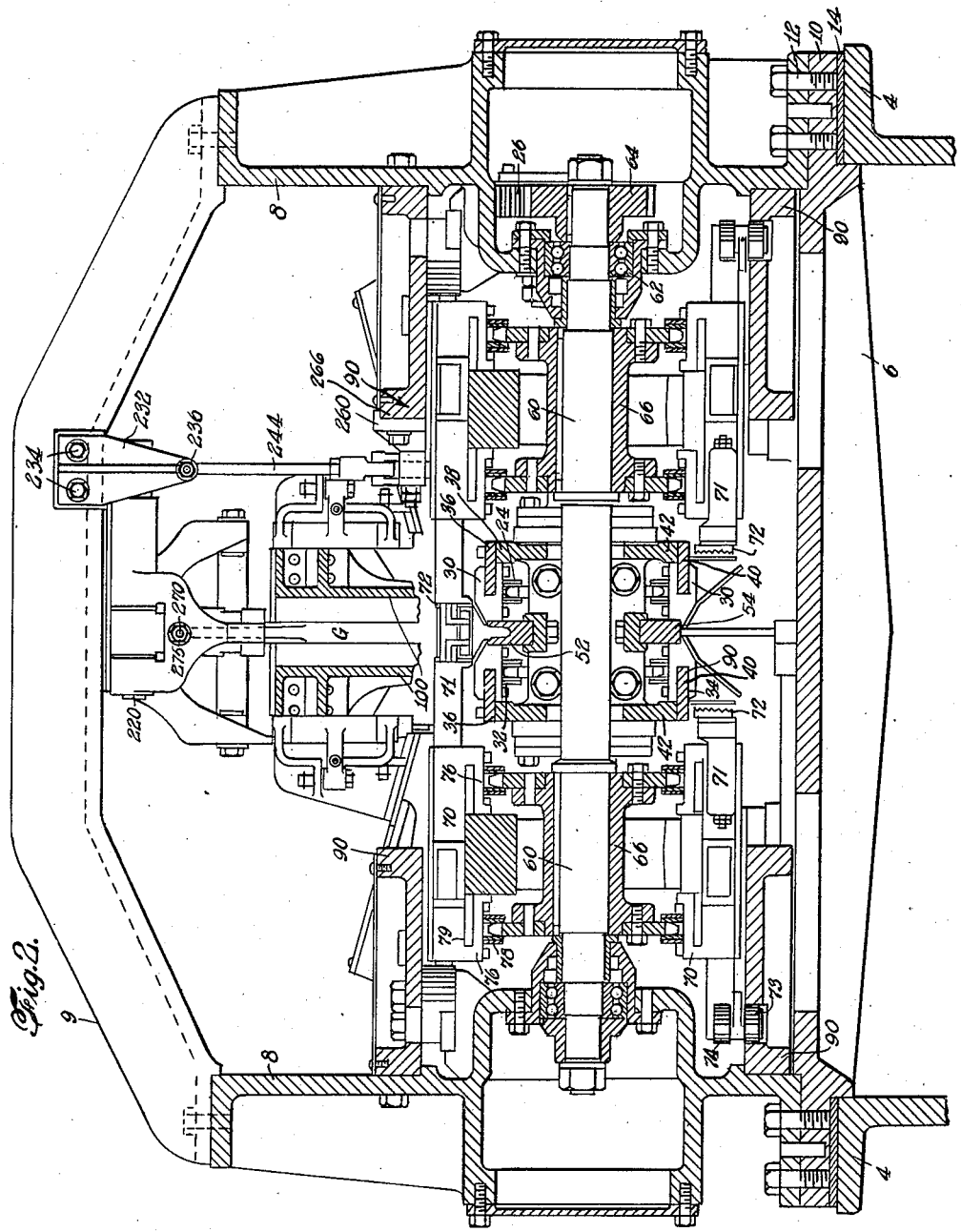
Figure 2 is a section on line 2—2 of Figure 1.

Each of the blocks 30 is provided with an inclined top surface 44, so that each pair of opposed blocks form a downwardly converging passage. A plate 46 is disposed on each of the inclined surfaces 44 and is secured to the respective blocks in any convenient manner, as by flat-headed screws 48. As shown in Figures 2 and 3, the portion of the plate 46 extending beyond the inclined surface 44 of the block 30 is bent upwardly, whereby the passage between the opposed plates 46 corresponds approximately to the shape of a fish. The lower endges 50 of the opposed plate 46 are in spaced relation with respect to each other and in close proximity to a fin guide 52 carried by the support 38. It is to be noted that the exterior walls of the fin guide 52 aid to maintain the blocks 30 on the rails 36 during their upper flight. A guide strip 54 carried by the support 42 serves to maintain the blocks 30 on the lower rails 40 during their lower flight.

The plate 46 is also supported by an open trough 56, each side of which is appropriately mounted in the machine. The block 30, together with the chains 24, constitute a fish-feeding or conveying means F.

Since the precise details of construction of the fish feeding or conveying means F form no part of the instant invention, only such parts thereof have herein been described as are necessary for an understanding of the invention. However, a full and complete description of the fish feeding and conveying means may be found in application Serial No. 536,506.

As shown in Figure 1, rearwardly of the shaft 20 there is provided a shaft 60 which is rotatably mounted in ball bearings 62 carried by the respective columns 8. The shaft 60 is provided with a gear 64 at one end thereof which is driven from a suitable source of power (not shown) through the gear 26. As shown in Figure 2, two pairs of sprockets 66 are secured in any appropriate manner to the shaft 60, and two pairs of chains 68 extend from the sprockets 66 forwardly in a substantially horizontal direction to two pairs of like sprockets secured to a shaft journaled in bearings suitably mounted on the machine (not shown). A pair of transversely aligned blocks, generally designated by the reference numeral 70, is mounted in predetermined spaced relationship on each pair of chains 68. In each of the blocks 70, there is slidably disposed a plunger 71, which at one end thereof carries a tail-gripping element 72 and at the other end is provided with two vertically aligned rollers, the upper and lower rollers being designated by the reference numerals 73 and 74 respectively.

Each block 70 is secured to the pair of chains 68 whereby it is conveyed through the apparatus. In the form shown, each block 70 is provided on each side thereof with an extension 76. A pair of lugs 78 secured to opposite sides of a link of the respective chain 68 is appropriately fastened to each extension 76. The extensions 76 of each block 70 terminate below and in spaced relationship to the base of the blocks 70 to provide a channel or passage 79 into which a plate 80 is positioned and over which the blocks travel during the upper flight of the chains 68. As shown in Figure 2, there are two plates 80, one on each side of the machine. Each plate 80 extends longitudinally of the machine adjacent the top flight of the chains 68 and is carried at the top of an I-beam 82 appropriately mounted in the machine. At the bottom, each I-beam 82 carries a guide 84 which guides the block, and a rail (not shown) mounted on a cross-member of the frame supports the block. The guide 84 and the rail (not shown) extend longitudinally of the machine adjacent the lower flight of the chains.

During the travel of the chains 68 in the lower flight, the plungers 71 are maintained in retracted (open) position due to rails which cooperate with the top rollers 73. When the chains pass around the sprockets 66, the rollers 73 engage a horse-shoe-shaped cam 90 which causes the plungers to move inward so that when the rollers 73 leave the horse-shoe cam 90, the gripping elements 72 will be in clamping relationship. A camming surface positioned longitudinally of the machine cooperates with each roller 73 to maintain the plungers 71 in position during the gripping action of the gripping elements. For preventing lateral displacement of the block as it passes around the sprockets 66, each block is provided with a pair of shoes 92 which cooperates with an arcuate cam (not shown). As shown in Figure 10 and for reasons which will become apparent, the block 70 is provided with a bevel surface 94.

Since the precise details of construction of the gripper mechanism and the conveyer therefor form no part of this invention, only such parts thereof have been described herein as may be necessary to understand the instant invention. A full and complete description of the gripper mechanism, the conveyer therefor and the appurtenant parts is disclosed in application Serial No. 534,709.

The gate G comprises two oppositely disposed gate members 100, each of which is provided at the top rear thereof with an angularly disposed ear 101 and an arm 102 at the bottom rear thereof carrying an ear 103 disposed at the same angle as the ear 101 and in spaced relationship thereto. Each pair of ears is secured to a shaft 104 positioned in an angularly disposed journal 106 and carried on one end of a standard 108. The angular disposition of the ears 101 and 103 relative to each other permits each gate member to be disposed in a vertical plane even though suspended on the inclined shaft 104. The standard 108 is provided with a horizontally extending base 110 which is secured by means of screws 112 to a shelf 114 secured to the column 8 by the screws 116.

Figure 4:
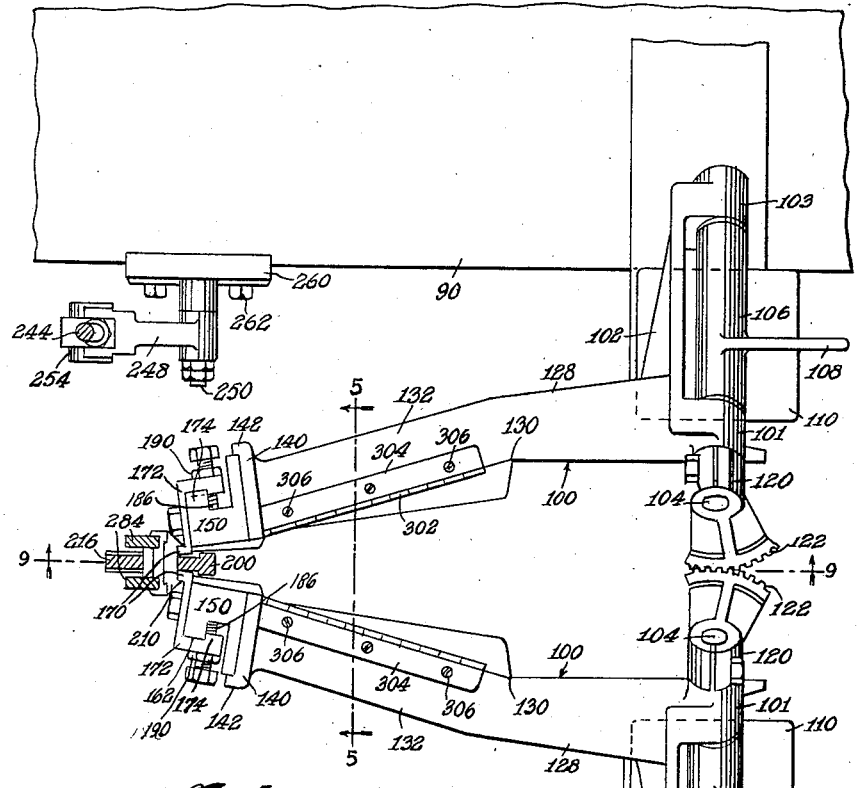
Figure 4 is a section on line 4—4 of Figure 1.

As is shown in the drawings and particularly Figure 4, the shafts 104 converge upwardly, and at the top of each shaft 104 there is secured a split hub 120 which carries a gear segment 122. As also shown in Figure 4, the two gear segments 122 are in mesh with each other and movement of one of the gate members 100 is transmitted through such gear segments 122 to the other gate member 100 whereby the movement of both gate members 100 is equalized.

The exterior side surface of each gate member 100 is formed with a pair of diagonally extending ribs 126 and 127 and a rib 128 at the upper edge thereof, the rib 128 constituting a laterally (outwardly) extending flange. The interior side surface of each gate member is finished and relatively smooth and is so shaped as to form a passage which converges to the front thereof. In the form shown in Figure 4, this is obtained by providing a bend 130 in the interior side surface of each gate member 100. The portion 132 of each gate member 100 beyond the bend cooperates to form the forwardly converging passage, the front edge of each gate, however, terminating in spaced relationship to the other.

The gate is so positioned in the machine that the converging passage formed by the gate members 100 is disposed in alignment with the path of travel of a fish as it is fed by the feeding conveyer F, whereby the fish will be fed therein. For reasons which will become apparent, a portion of the bottom of each gate member 100 is curved (concave), as indicated by the reference numeral 136. The toe 138 of each gate member is inclined upwardly at an angle substantially the same as that of the plate 46 of the feeding conveyer. It is to be noted, however, that the toe 138 is in spaced relationship to the plates 46 of the feeding conveyer.

At the front edge adjacent the top thereof, each gate member 100 is provided with a pad 140 having a vertical flange 142 at the rear thereof and a horizontal flange 144. As shown in Figures 3 and 10 of the drawings, the upper ends of the ribs 126 and 128 merge with the pad 140. The horizontal flange 144 extends outwardly from the inner face of the respective gate member and is formed integral with a rib 146 of the gate member.

A latch block, generally designated by the reference numeral 150, is secured, as shown in Figure 4, to the pad 140. As shown in Figure 7, the latch block 150 is provided with a flange 152 having a plurality of holes 154. By means of rivets passing through the holes 154, the flange 152 is secured to the pad 140. The latch block 150 is positioned on the pad 140 so that the vertical edge 158 and the bottom edge 160 rest against the vertical flange 142 and the horizontal flange 144, respectively, of the pad. The block 150 is provided with a horizontal groove 162 and a vertical groove 164 for reasons which will become apparent.

A male latching member 170, as shown in Figures 8 and 10, is provided at one end of a plate 172. The plate 172 is provided at the rear thereof with a projection 174 which is slidably disposed in the groove 162 of the latch block 150. A lock screw 176, extending through a slot 178 in the plate 172 and into a threaded hole 180 in the latch block 150, secures the plate 172, and hence the latch element 170, to the latch block 150.

At its other end, the plate 172 is provided with a block 182 which has a guide projection 184 which is positioned in the groove 164 of the latch block 150. An adjusting screw 186 extends through a hole 188 and has its free end seated against the base of the groove 164. Upon loosening of the lock screw 176 and manipulation of the adjusting screw 186, the latch block 150 may be moved relative to the latch 170. A lock nut 190 secures the adjusting screw 186 in position.

For reasons which will become apparent, the latch 170 extends from approximately the flange 144 to a substantial distance above the top of the latch block 150. Due to this, the edges of the plate 172 intermediate the latch element 170 and the block 182 are inclined and converged toward each other rearwardly.

Due to the manner in which each gate 100 is mounted on its respective shaft 104 and the fact that the gate is formed of a single casting, the two gates in the machine move toward each other because of gravity. A rigid and stationary stop 200 is positioned intermediate the latch elements 170 whereby, when engaged on opposite sides thereof by the latching elements 170, further movement of each gate toward the other is inhibited. Because each latch block 150 is slidably movable with respect to its respective latching element 170, it is apparent that the gates may be adjusted at the forward ends thereof relative to each other, whereby the exit of the converging passage may be made wider or narrower as desired. As shown in Figure 10, the stop 200 is carried at the lower end of an arm 202 of a bracket 204 which is secured to the channel tie 9 by means a screws 206.

The latching member 170 of each gate 100 cooperates with a female latching member 210 secured by rivets 212 to a support 214 carried at one end of a lever 216, the other end of said lever being secured to a shaft 220 rotatably mounted in arms 222 of the bracket 204. A bell-crank lever 224 is secured to the shaft 220, and one arm 225 of the bell-crank lever 224 is secured, as at 226, to a tension spring 228, the other end thereof being secured to a screw 230 adjustably mounted at one end of a support 232, the other end of the support 232 being secured to the channel tie 9 by means of screws 234. A nut 236 secures the screw 230 in adjusted position. The other end of the bell-crank lever 224 is secured to a pin 240 carried at one end of a clevis 242. The other end of the clevis 242 is adjustably secured to the top end of a pusher rod 244. A nut 243 locks the clevis 242 to the rod 244 in adjusted position. The lower end of the pusher rod 244 is adjustably secured to a clevis 246. A nut 247 locks the pusher rod 244 to the clevis 246. A rock lever has an arm 248 which is pivotally mounted on a stud 250. The rock lever arm 248 is bifurcated and carries a roller 254 which is positioned in the path of travel of the block 70, and particularly the bevel 94 thereof. The stud 250 is carried on a plate 260 which is adjustably mounted by means of the screws 262 and slots 264 cooperating therewith on a flange 266 of the horseshoe cam 90.

The arm 202 is provided with an adjustable stop screw 270 which is adapted to cooperate with a stop 272 carried by the arm 216. A nut 275 locks the stop screw 270 in adjusted position. From the details hereinbefore described, it is apparent that the female latching member 210 and the male latching elements 170 are normally urged into and held in locking relationship by virtue of the tension spring 228.

The secondary latch comprises a pair of discs 280, each provided with a tapered face 282. Each disc 280 is mounted on a pin 281 carried at one end of a lever 284. The other end of the lever 284 is secured to a pin 286 on the arm 216. The lever 284 is also provided intermediate its ends with a pin 287 which is adapted to be engaged by the semi-cylindrical groove 288 of the lever 216. The discs 280 of the secondary latch member are spaced so that the male latching elements 170 will be received therebetween.

From the foregoing description, it is apparent that the female (primary) latch 210 and the secondary latch 280 are normally urged into locking engagement with the male latch members 170 by the spring 228. When the roller 254 of the rock lever engages the bevel 94 of the block 70, the pusher rod 244 will be urged upwardly. This movement is transmitted by the bell-crank lever 224 to the shaft 220 which, in turn, actuates the lever 216 so that the primary female latch 210 will disengage the male latch elements 170. Outward movement of the arm 216 will also impart movement to the secondary latch lever 284, whereby the secondary latch will also release the male latching members. When the bevel 94 and the block 70 pass out of cooperative relationship with the roller 254 and there is no fish between the gate members 100, the tension spring 228 will, through the bell-crank lever 224, impart movement to the shaft 220 in such direction that the primary female latch 210 will engage the male latch elements 170, and the secondary latch member 280 will thereafter also be caused to engage the male latching members. However, after the passage of a fish between the gate members 100, the latter due to gravity return to their original position, and the lips 171 and 173 of the male latch elements will force the bevel of the female latch element 210 and the tapered faces 282 of the secondary latch element 280, respectively, outwardly until the gate members engage the stops 200. At this stage, the spring 228 urges the latch lever 216 inwardly, and the female latch elements 210 and 280 will be forced into locking position. It is to be noted that due to the arrangement of the various levers and arms, the secondary latch 280 in its movement to latching position acts subsequently to the respective latching action of the primary female latch 210.

Figure 5:
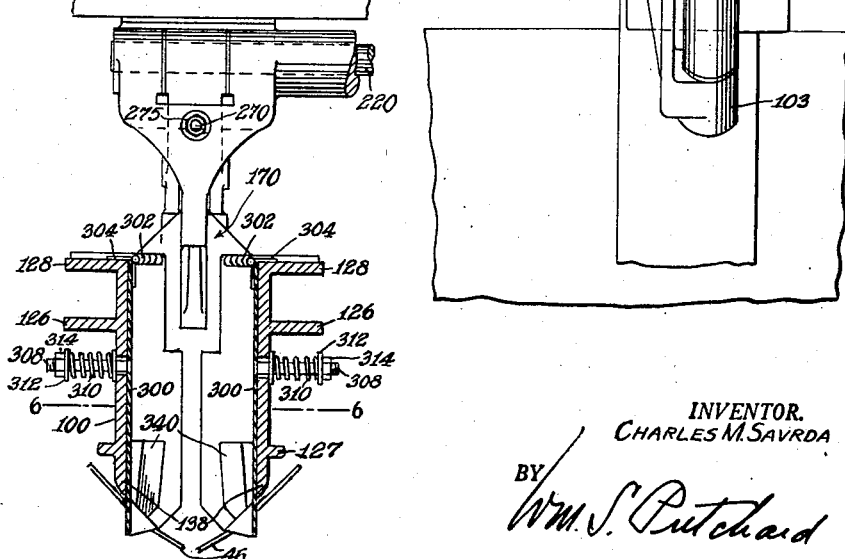
Figure 5 is a section on line 5—5 of Figure 4.

Each gate 100, and particularly the forward converging portion 132 thereof, is provided on its inner surface with a hinged plate, generally designated by the reference numeral 300. As shown in Figures 5 and 9, the hinged plate 300 is secured to a movable hinge element 302, the fixed or stationary element 304 being secured by screws 306 on the top flange 128 of the gate element. Each hinge element is secured to a screw 308 extending through a hole in the respective gate element 100. A compression spring 310 positioned between the outer wall of each gate member and between a collar 312 on the screw normally urges the respective hinged plate in contact with the respective gate element. A nut 314 threadedly positioned on the screw 308 permits adjustment of the tension.

Each hinged plate is provided at its upper forward corner with a cut-out portion 320, and the vertical and horizontal edges thereof are in alignment with the vertical and horizontal edges of the pad 140. As shown in Figure 9, the lower edge of each hinged plate 300 extends beyond the lower edge, and particularly the arcuate edge 136, of the respective gate member. The bottom of the hinged plate is formed with an inclined toe 324, which is of the same angularity as the inclined toe of the gate which is adjacent thereto. It is, however, to be noted that the inclined toe 324 of the hinged plate is of greater length than the toe of the gate. Rearwardly of the toe, the hinged plate is bent inwardly to form a tapered wing 326 which, as shown in Figure 9, extends below the lower edge of the gate.

Adjacent the inclined toe, each hinged member is also provided with a pad 340. The pad tapers both (forwardly) toward the front thereof and also (downwardly) toward the bottom thereof, as shown in Figures 5 and 6. At the rear, the pad is so machined, as shown at 344, that it merges with the face of the hinged plate 300.

In operation, a fish, tail leading and back downward, is placed upon the feed conveyer F and the feed plates 46 thereof feed the fish to the gate G. In the course of feeding, the tail of the fish extends in and passes through the guide 52 which, as has been previously described, is in close proximity to the lower ends of the plates 46. The tail, as it passes through the gate G, is engaged by the wings 326 of the hinged plates 300, which are of a shape and contour to position it properly in a vertical direction. As the fish is continued to be fed in the gate and after the tail has been positioned in a vertical direction by the wings 326, the tail passes between the pads 340 and through the mouth of the gate. The pads 340, however, engage the fish at the sides thereof, and, when the fish is of a size as to engage the pads 340, it becomes wedged therebetween and prevents further movement of the fish, even though the feed conveyer extends and continues to travel beyond the mouth of the gate. It is to be noted that due to the downward and forward tapering of the pads 340, the fish is urged downwardly. At this stage of the operation, the tail of the fish is projecting beyond the mouth of the gate and is in a substantially vertical position and the sides of the fish are secured by the pads 340.

While the foregoing is being performed and the fish is being positioned in the gate, a pair of oppositely disposed plungers 71 carrying the gripping elements 72 have passed around the sprockets 66 and are being urged by the rollers 73 traveling in the horse-shoe cams 90 to move toward each other so that when a pair of gripping elements 72 are in position or just beginning to grip the tail therebetween, the bevel 94 of the block 70 engages the roller 254, with the result that the primary female latch 210 and the secondary latch 280 are released, as previously described.

In order to permit the gripping elements 72 to clamp the fish therebetween, the feed conveyer is provided with short plates 46 where this operation is performed. The open trough 56 also serves to guide and support the fish in the region of the short plates. Since the feed conveyer travels at a higher speed than the conveyer carrying the gripping elements and the feed end of the conveyer carrying the gripping elements is before the discharge end of the feed conveyer, a sufficient number of short plates 46 are provided to allow space for the gripping elements to clamp the fish and until the conveyers are no longer in overlapping relationship.

At this stage of the operation, the female latches 210 and 280 are released and the tail is clamped between the gripping elements and pulled forwardly from the gate. Each gate member follows the approximate contour of the size of the fish, and any movement of one of the gate members is transmitted to the other through the gear segments 122 which equalize the movements of the plates. As the gate members are spread by the thick portion of the fish passing therethrough, the pad 340 and the wings 326 serve to maintain the fish in the proper central position.

If for any reason the gate members 100 remain open, the gripping elements 72 follow the contour 136 at the bottom of each gate member 100 and engage the hinged plates 300 and urge them against the action of the compression springs 310 toward each other and away from the respective gate members. This action avoids injury and damage to the gripping elements 72. If for any reason the gate members are not functioning properly, the machine is stopped and the cause of the improper functioning of the machine eliminated.

Since it is obvious that various changes and modifications may be made in the above description without departing from the nature or spirit thereof, this invention is not restricted thereto except as set forth in the appended claims.

I claim:

1. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, means to lock said gate members in fish-receiving position, means to render the locking means ineffective at predetermined times to permit the fish to be fed from said gate, and means at the forward end of each gate member to adjust the forward end of each gate member relative to the other.

2. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of gate members, a pair of upwardly converging shafts, each of said gate members having adjacent the rear thereof angularly disposed ears through which the respective shaft extends, whereby said gate members are oppositely disposed in vertical planes forming a passage converging toward the front thereof, means to lock said gate members in fish-receiving position, means to render the locking means ineffective at predetermined times to permit the fish to be fed from said gate, stop means adjacent the forward ends of the gate members to limit the movement of said gate members toward each other, and means at the forward end of each gate member to adjust the forward end of each gate member relative to the other.

3. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of gate members, a pair of upwardly converging shafts, each of said gate members having adjacent the rear thereof angularly disposed ears through which the respective shaft extends, whereby said gate members are oppositely disposed in vertical planes forming a passage converging toward the front thereof, a gear sector secured adjacent the top of each shaft, said gear sectors being in mesh, means to lock said gate members in fish-receiving position, means to render the locking means ineffective at predetermined times to permit the fish to be fed from said gate, and means at the forward end of each gate member to adjust the forward end of each gate member relative to the other.

4. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, each of said gate members having a toe parallel to and in spaced relationship to said plates on said feed conveyer, means to lock said gate members in fish-receiving position, and means to render the locking means ineffective at predetermined times to permit the fish to be fed from said gate.

5. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of gate members forming a passage converging toward the front thereof, a male latch element on the upper forward end of each gate member, a female latch element cooperating with said male latch elements to lock said gate members in fish-receiving position, and means on the conveyer carrying the tail-gripping elements to actuate said female latch element into inoperative position at the time the tail-gripping elements begin to clamp the tail of the fish therebetween.

6. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of gate members forming a passage converging toward the front thereof, a male latch element on the upper forward end of each gate member, a female latch element cooperating with said male latch elements to lock said gate members in fish-receiving position, means on the conveyer carrying the tail-gripping elements to actuate said female latch element into inoperative position at the time the tail-gripping elements begin to clamp the tail of the fish therebetween, and spring means to restore the female latch element into locking position after the fish has been fed from said gate.

7. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of gate members forming a passage converging toward the front thereof, a male latch element on the upper forward end of each gate member, a primary female latch element cooperating with said male latch elements to lock said gate members in fish-receiving position, a secondary female latch element cooperating with said male latch elements, and means on the conveyer carrying the tail-gripping elements to actuate said female latch elements into inoperative position at the time the tail-gripping elements begin to clamp the tail of the fish therebetween.

8. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of gate members forming a passage converging toward the front thereof, a male latch element on the upper forward end of each gate member, a primary female latch element cooperating with said male latch elements to lock said gate members in fish-receiving position, a secondary female latch element cooperating with said male latch elements, means on the conveyer carrying the tail-gripping elements to actuate said female latch elements into inoperative position at the time the tail-gripping elements begin to clamp the tail of the fish therebetween, and means to restore the primary female latch element into locking position before the secondary female latch element is restored to locking position.

9. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of gate members forming a passage converging toward the front thereof, a block secured to the upper forward end of each gate member, a male latch element slidably mounted on each of said blocks, stop means engaged by said male latch element, means to adjust the male latch elements relative to said blocks whereby the mouth of the gate is adjusted, a female latch element cooperating with said male latch elements to lock said gate members in fish-receiving position, and means on the conveyer carrying the tail-gripping elements to actuate said female latch element into inoperative position at the time the tail-gripping elements begin to clamp the tail of the fish therebetween.

10. In an apparatus having a conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of gate members forming a passage converging toward the front thereof, a block secured to the upper forward end of each gate member, a male latch element slidably mounted on each of said blocks, stop means engaged by said male latch elements, means to adjust the male latch elements relative to said blocks whereby the mouth of the gate is adjusted, a female latch element cooperating with said male latch elements to lock said gate members in fish-receiving position, a second female latch element engaging said male latch elements below the first female latch element, and means on the conveyer carrying the tail-gripping elements to actuate said female latch elements into inoperative position at the time the tail-gripping elements begin to clamp the tail of the fish therebetween.

11. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, means to lock said gate members in fish-receiving position, means to render the locking means ineffective at predetermined times to permit the fish to be fed from said gate, and a plate hinged at the top thereof to the top of each gate member, each of said hinged plates having a toe parallel to and in spaced relationship to said plates on said feed conveyer.

12. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, means to lock said gate members in fish-receiving position, means to render the locking means ineffective at predetermined times to permit the fish to be fed from said gate, and a plate hinged at the top thereof to the top of each gate member, each of said hinged plates having a wing at the bottom thereof to properly position the tail of the fish.

13. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, means to lock said gate members in fish-receiving position, means to render the locking means ineffective at predetermined times to permit the fish to be fed from said gate, and a plate hinged at the top thereof to the top of each gate member, each of said hinged plates having a pad adjacent the lower forward end to urge the fish downward.

14. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, means to lock said gate members in fish-receiving position, means to render the locking means ineffective at predetermined times to permit the fish to be fed from said gate, and a plate hinged at the top thereof to the top of each gate member, each of said hinged plates having a pad adjacent the lower forward end to engage the sides of the fish and secure said fish in the gate.

15. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, each of said gate members having a curved bottom edge, a plate hinged to each gate member and extending below said curved bottom edge, means on each hinged plate adjacent the bottom edge to properly position the tail of a fish as it is fed thereover, means to lock said gate members in fish-receiving position, means to render the locking means ineffective at predetermined times to permit the fish to be fed from said gate, and means to engage and securely hold a fish at the sides thereof.

16. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, means to lock said gate members in fish-receiving position, means to render the locking means ineffective at predetermined times to permit the fish to be fed from said gate, and a plate hinged at the top thereof to the top of each gate member, each of said hinged plates having a pad adjacent the lower forward end to urge the fish downward, each pad tapering toward the front thereof and also toward the bottom thereof.

17. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, means to lock said gate members in fish-receiving position, means to render the locking means ineffective at predetermined times to permit the fish to be fed from said gate, and a plate hinged at the top thereof to the top of each gate member, each of said hinged plates having a tapering wing at the bottom thereof to properly position the tail of the fish.

18. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, each gate having a toe parallel to and in spaced relationship to said plates on said feed conveyer, means to lock said gate members in fish-receiving position, means to render the locking means ineffective at predetermined times to permit the fish to be fed from said gate, and a plate hinged at the top thereof to the top of each gate member, each of said hinged plates having a toe parallel to and in spaced relationship to said plates on said feed conveyer, the toe of each hinged plate being of greater length than the toe of the gate member adjacent thereto.

19. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, each gate having a toe parallel to and in spaced relationship to said plates on said feed conveyer, means to lock said gate members in fish-receiving position, means to render the locking means ineffective at predetermined times to permit the fish to be fed from said gate, a plate hinged at the top thereof to the top of each gate member, and means to normally maintain each plate in contact with the gate member adjacent thereto, each of said hinged plates having a toe parallel to and in spaced relationship to said plates on said feed conveyer, the toe of each hinged plate being of greater length than the toe of the gate member adjacent thereto.

20. In an apparatus having a conveyer, spaced angularly disposed plates on said conveyer to feed a fish, tail leading and back downward, a conveyer having a pair of spaced gripping elements to clamp the tail of said fish and means to actuate said gripping elements into fish-gripping position adjacent the discharge end of said feed conveyer, a gate positioned in the path of said feed conveyer to receive a fish fed thereto and hold it in position to be gripped by said gripping elements, said gate comprising a pair of oppositely disposed gate members forming a passage converging toward the front thereof, means to lock said gate members in fish-receiving position, means to render the locking means ineffective at predetermined times to permit the fish to be fed from said gate, a plate hinged at the top thereof to the top of each gate member, each of said hinged plates having means at the bottom thereof to properly position the tail of the fish, and means to engage and hold the fish at the opposite sides thereof.

CHARLES M. SAVRDA.